Sept. 5, 1967        D. G. WELLS        3,339,700
SAMPLING APPARATUS
Filed Sept. 24, 1965
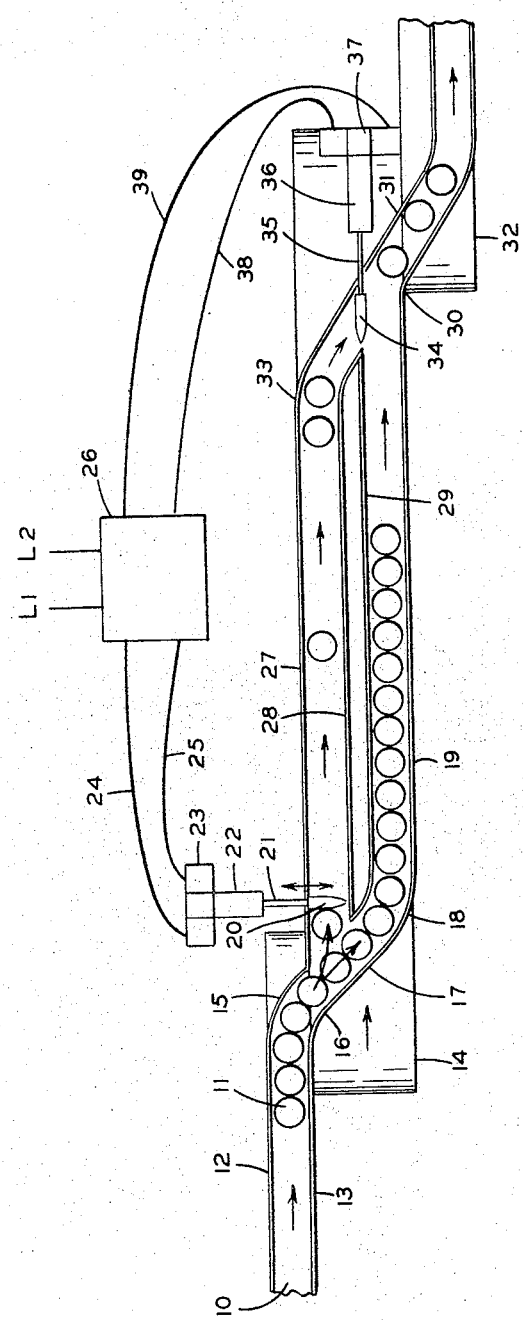
INVENTOR
DONALD G. WELLS
BY *Stephen S. Keating*
ATTORNEY

United States Patent Office 3,339,700
Patented Sept. 5, 1967

3,339,700
SAMPLING APPARATUS
Donald G. Wells, Millville, N.J., assignor to Armstrong Cork Company, Lancaster, Pa., a corporation of Pennsylvania
Filed Sept. 24, 1965, Ser. No. 489,935
3 Claims. (Cl. 198—31)

The present invention relates to a sampling apparatus and more particularly to sampling apparatus for conveyor systems.

Industrial quality control programs in many instances call for random sampling of manufactured goods at periodic points during the production process. Some of the sampling systems of the prior art include manual sampling, numerically spaced sampling, etc.

The device of the present invention provides sampling apparatus for conveyors wherein samples may be diverted periodically from a line of production articles. The samples may be visually or otherwise inspected on the conveyor or at a point remote therefrom. The apparatus of the present invention also provides means for returning diverted samples to the main stream or line of production articles after the sampling and any testing operations have been completed.

Accordingly, it is an object of the present invention to provide sampling apparatus for a conveyor system wherein samples are diverted periodically from a main line or stream.

Another object of the present invention is to provide sampling apparatus for a conveyor system wherein samples are removed periodically therefrom and may be returned to said conveyor subsequent to sampling and/or testing.

Other objects of the present invention will be readily apparent from the detailed description thereof with reference to the drawing wherein The figure is a plan view of a conveyor system employing sampling apparatus according to the present invention.

The figure there is shown a conveyor 10 which may move a plurality of articles 11 such as glassware, for example, in the direction indicated by the arrows. Suitable guide rails 12 and 13 may be provided adjacent conveyor 10 to guide articles 11 in the proper direction.

Adjacent to conveyor 10 is conveyor 14 which moves in the direction indicated by the arrows. Guide rails 12 and 13 may have cooperating arcuate portions 15 and 16 which guide articles 11 from conveyor 10 onto conveyor 14. Subsequent to arcuate portion 16, guide rail 13 has a straight portion 17, a reversed arcuate portion 18, and a relatively long straight portion 19.

Opposite straight portion 17, there is a reciprocable gate 20 which may be secured to the operating rod 21 of a double acting air cylinder 22. The air supply to cylinder 22 may be controlled by electrically controlled air valve mechanism 23. Electrically controlled air valve 23 may be connected by suitable conductors 24 and 25 to a conventional time control unit 26 which is in turn connected to a suitable source of power L1 and L2.

Gate 20 extends across a portion of conveyor 14 in closing relationship to and downstream of an opening defined by the juncture of arcuate portion 15 and straight portion 27 of guide rail 12 and the left-hand juncture of guide rails 28 and 29 which along with straight portion 27 are parallel to straight section 19. Gate 20 is placed downstream of the opening a distance such that a single article may be accommodated between straight portion 27 and guide rail 28 upstream of said gate 20 when it is closed. Movement of the conveyors 10 and 14 will cause a single article to be moved into said opening in contacting relationship with gate 20. Thereafter, subsequent articles 11 may be moved against and past the article 11 in said opening as said article 11 in the opening operates as a cam or guide for the subsequent articles which move laterally thereof on conveyor 14. Electric time control unit 26 is adjustable and may be set to actuate periodically valve 23 such that air cylinder 22 will retract gate 20 whereupon an article 11 lodged in the opening between straight section 27 and guide rail 28 will pass through said gate 20 in accordance with the movement of conveyor 14. The duration of time that the gate 20 remains in the open position may be adjusted by means of the time control unit 26 to allow one or more articles 11 to enter the passageway between straight section 27 and guide rail 28. This passageway acts as a receiving area or section for samples which may be inspected therein or removed therefrom to an appropriate inspection area.

Once the article which was located in the opening passes through gate 20, a subsequent article will move along arcuate portion 15 until it reaches the juncture of portion 15 and straight portion 27 at which point said subsequent article will be free to move into the opening. If the gate 20 is closed, the subsequent article will contact said gate and be held thereby. However, if the gate 20 remains in the open position then successive articles will continue to enter the opening and pass therethrough.

It was found that the heretofore mentioned spacing of the gate 20 downstream of the opening between arcuate portion 15 and guide rail 28 reduced the possibility of jamming of articles at said opening and provided a recess into which a single article would move easily and effectively for sampling purposes.

Those articles 11 which do not pass into the receiving area are carried by conveyor 14 between guide rail 29 and portions 17 to 19. These articles 11 may move in the directions indicated by the arrow until they reach arcuate portion 30 and straight portion 31 at which point said articles 11 will be cammed or guided off conveyor 14 onto adjacent conveyor 32. Thereafter, articles 11 will be carried by conveyor 32 to appropriate processing operations.

Straight portion 31 is joined to straight portion 27 by means of arcuate portions 33. Straight portion 31 is spaced from the right-hand juncture of guide rails 28 and 29 thereby forming an opening through which samples from the receiving area may pass as they are directed back into the main line or stream of articles 11. A gate 34 may be placed in reciprocating relationship across this opening. Gate 34 may be secured to the actuating rod 35 of double acting air cylinder 36. The air supply to air cylinder 36 may be controlled by an electrically operated valve mechanism 37 which is connected through suitable conductors 38 and 39 to time control unit 26. Time control unit 26 may be adjusted to retract periodically gate 34 to allow any articles therebehind to pass back into the main line or stream of articles.

It is to be understood that time control unit 26 is adjustable in nature so that either or both of the gates 20 and 34 may be actuated periodically, simultaneously, sequentially, or in any other pattern to allow articles to pass in and out of the receiving area defined between straight portion 27 and guide rails 28. This receiving area as stated above represents a sampling area. The operator of the device may set the control unit 26 to obtain a true statistical sample of production during any given period. The number of samples taken during any one period may be varied by varying the time control unit 26 and the actuation of gates 20 and 34. The gates 20 and 34 may be set to open only upon manual actuation. In cases where a sampling is to cover a production period, the gate 34 will be set to remain closed, while gate 20 may be opened periodically to allow a sampling of articles to accumulate in the receiving area. Thereafter, the sample articles may be inspected and/or removed from the receiving area. If the samples are to be returned to the line, the gate 34 may be then actuated to accomplish that result. It is apparent that many combinations of sampling cycles and recombining cycles may be provided with the apparatus according to the present invention. Further, such sampling and/or recombining may be automatic or manual.

The sampling apparatus according to the present invention may be placed at various points throughout a production operation to obtain suitable sampling at that point. Further, this sampling apparatus is flexible in that it allows automatic sampling during periods wherein the sampling area may be unattended. Thus, the samples may be collected and may be inspected at any time. Further, the samples may be returned to the main line of articles, if desired, at any time.

It is to be understood that the present invention is not limited to the particular embodiment shown and described herein. For example, the particular size, shape, relative location, composition, etc. of elements and components may be varied.

Various modifications of the present invention will occur to those skilled in the art without departing from the scope and spirit thereof as defined in the claims.

I claim:

1. Sampling apparatus comprising a main line conveyor for carrying a plurality of articles past a sampling area, means for guiding articles on said conveyor, article diverting gate means and a receiving area before the gate means, said gate means and said receiving area forming means to retain a sample of the conveyed articles and to permit the sample to act as a part of the means for guiding articles on said conveyor, timer means to control said gate means to effect periodical opening and closing thereof to release the sample from the receiving area, means associated with said gate means for receiving articles passing therethrough when said gate means are open so that articles may be diverted periodically from said guiding means to said sampling area.

2. The sampling apparatus of claim 1 further comprising means to cause diverted articles to rejoin the remainder of said articles on the main line conveyor.

3. The sampling apparatus of claim 2 wherein said means to cause rejoining of articles includes a gate means which is timer controlled.

References Cited

UNITED STATES PATENTS

| | | | |
|---|---|---|---|
| 1,427,325 | 8/1922 | Quick | 198—31 X |
| 1,923,753 | 8/1933 | Scofield | 198—31 |
| 2,602,534 | 7/1952 | Hartmann | 198—31 |
| 2,930,475 | 3/1960 | Muhlenbruch | 198—32 |
| 3,101,848 | 8/1963 | Uhlig | 198—31 X |

EVON C. BLUNK, *Primary Examiner.*

M. J. AJEMAN, *Assistant Examiner.*